United States Patent Office 3,806,348
Patented Apr. 23, 1974

3,806,348
FOG DISPERSING COMPOSITIONS
Goesta Wollin, Snedens Landing, Palisades, N.Y. 10964, and David B. Ericson, 625 S. Broadway, Nyack, N.Y. 10960
No Drawing. Original application Apr. 21, 1969, Ser. No. 818,069, now Patent No. 3,595,477. Divided and this application July 21, 1971, Ser. No. 164,921
Int. Cl. C09k 3/18
U.S. Cl. 106—13                  7 Claims

ABSTRACT OF THE DISCLOSURE

This disclosure is directed to novel compositions and to their use to disperse fogs or to produce rain. These compositions are fluid mixtures formed without, or with minor amounts of, water.

Examples of compositions of this invention include:
(1) urea, ammonium nitrate and water;
(2) acetamide, ammonium nitrate and water;
(3) acetamide, urea and water; and
(4) acetamide, urea and ammonium nitrate.

CROSS REFERENCES

This application is a division of Ser. No. 818,069, filed Apr. 21, 1969, by Wollin and Ericson, now Pat. No. 3,595,477.

BACKGROUND

Conventional methods of dispersing a fog by artificial means are all based upon modification of the factors responsible for the stability of the fog aerosol. Fog droplets may be evaporated by the direct application of heat, or droplets may be absorbed by the use of a hydroscopic substance.

A large mass of suspended water exists in a fog and a considerable expenditure of energy is required to remove it. For example, over an airport runway, one or two tons of water would be held in a fog which extends to a height of 70 meters over an area 2,000 meters long by 100 meters wide. A vast amount of heat is therefore required to evaporate the droplets and to reduce the relative humidity. This may be accomplished by burning gasoline or oil in burners along a runway. This thermal technique produces large amounts of smoke during the burning of the fuel and involves expensive installations and high-running costs.

In the absorption methods a hygroscopic substance such as calcium chloride is introduced into the fog to reduce the relative humidity of the air. The equilibrium between the fog droplets and the ambient humid air in which they are suspended is destroyed with the resultant evaporation of fog particles. This method involves the risk of corrosion of adjacent property and vegetation.

Another method for fog dispersion is the use of sonic or electrostatic precipitation, but this is not practical for large-scale operations. The use of ultrasonic vibration to bring the fog droplets together into large raindrops produces vibrations which produce discomforts for people in the vicinity of these operations.

Another method includes blowing sodium chloride into a fog to turn the fog droplets into raindrops by attraction. This seeding method has several advantages, but involves a high risk of corrosion and damage to vegetation and property.

The above and numerous other methods have been developed in large-scale research projects which have been justified by the magnitude of the problem involved. The occurrence of fog produces many problems for aircraft, automobiles and boats. The cancellation of flights alone, due to fogs, costs airlines millions of dollars annually.

It is an object of this invention to improve the methods of fog dispersion, and to overcome the problems which presently exist.

It is a further object of this invention to provide for the rapid and substantial dispersion of fog by a low-cost method which does not employ substances which may be harmful to people, vegetation or property.

Another object is also to produce rain from cloud formations.

Yet another object is to provide new compositions which are useful for fog-dispersing, rain-making, and other purposes.

THE INVENTION

This invention is directed to novel compositions and methods for dispersing fog and producing rain. The compositions are characterized by the absence of water or the use of less water than would be required to separately dissolve the ingredients of the composition. The compositions comprise at least two of the compounds selected from the group consisting of acetamide, urea and ammonium nitrate. Additional compounds such as other salts or glycols may be added to the composition, as set forth in greater detail below.

A composition of acetamide, urea and ammonium nitrate, in the approximate mole ratio of 1–2:1:1 forms a fluid mixture, even in the absence of water. Compositions of acetamide with urea, acetamide with ammonium nitrate, and urea with ammonium nitrate, each with a minor amount of water, also form a fluid mixture.

Examples of these compositions are (ratios are in moles):

(I) urea, ammonium nitrate and water, 1:1:½;
(II) acetamide, urea and water, 2:1:¾; and
(III) acetamide, ammonium nitrate and water, 2:1:½.

Although water, or greater amounts of water than indicated herein, may be used in any of the above compositions, it has been found that an amount of water which is less than that necessary to dissolve the individual ingredients may be used to form fluid mixtures which are useful for dispersing fog or producing rain.

Fogs may be characterized as those which occur above freezing temperature, a warm fog, and those which are at, or below, freezing temperature, a cold fog. The so-called warm natural fog accounts for about 95% of the fog occurrences in the United States. The other 5% is a cold fog which tends to occur inland or in low temperature regions. Warm natural fog is an aerosol consisting of a suspension of small warm droplets wherein the water vapor pressure saturates the ambient air with respect to the fog particles. Typical warm fogs contain about 1 to 10 fog particles per cubic centimeter of air. The fog droplets are between 2 and 100 microns in diameter and most of the liquid fog water is in the form of droplets having diameters between 20 and 50 microns. The compositions of this invention are particularly suitable for dispersing these warm fogs. This invention is also applicable to producing rain from cloud formations.

This invention will be illustrated in greater detail by reference to the following description and specific embodiments.

(I) UREA, AMMONIUM NITRATE AND WATER

Three hundred and ten grains of ammonium nitrate and 230 grains of urea were mixed together and added to 60 grains of water; the mole ratio was approximately 1:1:0.85. The mixture comprised nine parts by weight of solids to one part by weight of water (hereinafter referred to as the 9-to-1 mixture). The mixture slowly started to fluidize and after stirring, a colorless, homogeneous solution was obtained. A sample of the solution was refrigerated overnight at 6° C. The solution did not crystallize, and it remained sufficiently fluid for passage through a nozzle. It was found that the solution did not produce any substantial corrosion on aluminum surfaces.

The solution had a vapor pressure of 8.6 mm. at 25° C., which is considerably below the vapor pressure of its constituents, which are: water—23.8 mm.; urea (saturated aqueous solution)—18.3 mm.; and ammonium nitrate (saturated aqueous solution)—14.7 mm.

The density of the solution was 1.36 grams/cm.$^3$.

One drop of the above 9-to-1 solution was placed on a watch glass. The drop grew considerably in size when exposed to atmospheric conditions. A drop of a saturated aqueous solution of urea was placed on a watch glass and a drop of a saturated aqueous solution of ammonium nitrate was placed on a separate watch glass, each evaporated and started to crystallize under the same conditions.

The above solution can be used effectively to disperse fog when sprayed from an airplane or from a ground-operated system in droplet sizes of about 20 to 400 microns, and preferably from about 75 to 200 microns. When the droplets are too small, they stay in suspension too long and create fog, and when the droplets are too large, they fall too rapidly to effectively dispel fog.

A stable and thick fog was made from a salt (NaCl) solution in a chamber of about 23 cubic meters. About 20 ml. of the above solution was sprayed into the chamber and the fog cleared within about ten seconds.

A B-25 airplane was used to spray 700 gallons of the above 9-to-1 solution during one lap on a racetrack pattern over a fog. The B-25 was equipped with a sprayer having 40 nozzles with $\frac{3}{16}$″ orifices. Measurements from a laboratory airplane reported that there was a substantial increase in the water content in a sprayed area about 200 to 500 feet below the surface of the upper layer of fog where the spraying was conducted. Tests from the laboratory airplane showed that the solution had produced a water content of 3 grams of water per cubic meter in the test area. In this kind of test operation, the most important measure of the effectiveness of the fog-dispelling agent is the change in the water content below the sprayed area. The fog itself had a water content of 0.9 gram of water per cubic meter of air. A fog-dispelling agent is considered quite effective when it produces a water content of 1.5 grams of water per cubic meter of air; this amount of water is considered to be a drizzle. One of the most effective chemical solutions previously used had been calcium chloride. Calcium chloride produces a drizzle with a water content of up to 1.9 grams of water per cubic meter. Thus, the solution of the present invention is considerably more effective than prior art solutions, and in fact produced rain which is classified as a water content above 2.5 grams per cubic meter.

A fog-dispelling operation was carried out from a B-25 following a dog-bone pattern over an airport. Seven hundred and fifty gallons of a 9-to-1 solution were used. The solution was sprayed at the top of the fog deck which varied from 800 to 1200 feet above the airport. The airport was completely closed in prior to the spraying operation and the ceiling was zero. The spraying operation resulted in a clearing of the runway which was visible from the B-25 for fifteen minutes before the fog closed the airport again. The spraying operation was carried out for a period of seven minutes. The fog was characterized as a warm fog which is the characterization of ninety five percent (95%) of the fog that occurs at airports in the United States. The fact that the airport was closed in after being open for fifteen minutes is evidence that the clearing was due to the spraying operation and not an instance where the fog was starting to be dispelled by natural occurrences.

In another operation, the B-25 followed a dog-bone pattern in which the sprayed area was traversed four times. Under these conditions, the laboratory airplane reported the production of rain with 4.5 grams of water per cubic meter of air.

Temperatures around 0° C. tend to thicken the 9-to-1 mixture and may tend to plug the nozzles used to spray the mixture. Under these conditions additional amounts of water may be used in the fog dispelling solution. In further flight operations, two C-123 airplanes, each with a load of a mixture made of 870 gallons of 9-to-1 solution and 310 gallons of water and a B-25 with a load of a mixture made of 650 gallons of 9-to-1 solution and 100 gallons of water, were used. The mixtures were maintained in storage and transported in tank trucks with heaters. The three planes sprayed their loads in a race track pattern. The visibility was zero before the spraying operation and was brought to ILS (instrument landing system) minimum and kept clear for 35 minutes, even though the solutions were considerably diluted with water.

The 9-to-1 solution starts to get thicker at about +8° C. Therefore, in weather around 0° C., the aircraft may use heaters to keep the solution above this temperature.

One or more additives may be used with the combination of urea-ammonium nitrate-water disclosed above. For example, low molecular weight amino or amide compounds, water-soluble salts, glycols, and low molecular weight alcohols are among the additives which may be used for such purposes as a corrosion preventative, a diluent, or to otherwise improve the fog dispelling characteristics of the compositions. These additives may be used in varying amounts, with or without additional water.

Suitable solutions of (a) 1 mole ammonium nitrate, 1 mole urea, 1 mole ethylene glycol, and 0.5 mole water (24 parts chemicals to 1 part water); and (b) 1 mole ammonium nitrate, 1 mole urea, 0.5 mole formamide, and 0.5 mole water (18 parts chemicals to 1 part water) are very effective fog-dispelling agents, and in addition, they do not start to thicken until about 4° C.

A solution was made from 55 grams of glycerin, 35 grams ammonium nitrate, 30 grams urea and 8 grams water. This solution was very effective in dispelling fog and had almost no corrosive effect on copper and none on aluminum. The solution had a density of 1.29. Another suitable solution was made with 39 grams ammonium nitrate, 32 grams urea, 29 grams sucrose and 5 grams water.

The following solution effectively dispelled the fog in a fog chamber: 50 parts glycerin, 30 parts ammonium nitrate, 25 parts urea, 25 parts isopropyl alcohol, and 3 parts water. However, this mixture does raise a corrosion problem.

A mixture was made from 290 grains of water, 200 grains of ammonium sulphate, 290 grains ammonium nitrate and 450 grains of urea. A colorless solution suittable for dispelling fog was formed which did not crystallize.

The mole ratio of urea+ammonium nitrate:water (i.e. solids to liquid) may be from about 1:0.25 to 2.5 with the lesser amounts of water being preferred. The mole ratio of urea: ammonium nitrate is approximately 1:1. It should be noted that variations in these ratios may be made. For example, if the ratio of urea to ammonium nitrate is 1:1.25, and the minimum amount of water is used, .5 mole, up to 0.25 mole of ammonium nitrate will remain in the fluid mixture to form a slurry; however, enough additional water may be used to dissolve the ammonium nitrate.

(II) UREA, ACETAMIDE AND WATER (III) ACETAMIDE, AMMONIUM NITRATE AND WATER

In the mixture of urea, ammonium nitrate and water, either the urea or the ammonium nitrate may be replaced partially or wholly on a molar basis by acetamide. Furthermore, a slightly greater amount of acetamide on a molar basis may be used in replacing either the urea or ammonium nitrate.

A mixture was made of 2 moles acetamide, 1 mole of urea and ¾ mole of water. This composition readily became fluid upon mixing.

A fluid composition was made by mixing together 2 moles acetamide, 1 mole ammonium nitrate and ½ mole water.

These fluid mixtures are suitable for fog dispelling in the same manner as previously described, with or without the additional components set forth above.

(IV) UREA, ACETAMIDE AND AMMONIUM NITRATE

The following example illustrates that fluid mixtures may be made in the complete absence of water. Six plates of phosphorous pentoxide were placed in a dry box to bring the humidity inside down to 0% and to dry the chemicals which were used. The humidity in the box was initially 40% and the temperature 79° F. The box contained a small fan to circulate the air and to make the drying more effective. The box was equipped with telescopic rubber gloves to make it possible to work effectively within the box after it was completely sealed. The following mixture was placed in the dry box with each component initially in a separate container:

|  | Grams |
|---|---|
| Acetamide | 2.95 |
| Ammonium nitrate | 2 |
| Urea | 1.5 |

The chemicals had each been dried for more than a day in a desiccator before they were placed in the dry box, and the box sealed. After one day in the dry box, the humidity was 0% and the temperature 79° F. The components were taken from their separate containers and placed in a glass jar. After about five minutes of stirring, the components started to stick to the glass rod, indicating that fluidization had started. After another five minutes, the mixture started to become more fluid and the mixing was stopped. The fluidization continued and a homogeneous fluid solution was obtained, with a viscosity approximating that of water.

The density of a fluid solution of acetamide, urea and ammonium nitrate (mole ratio, 2:1:1) was determined as follows:

|  | Grams |
|---|---|
| 2×0.085 mole acetamide | 10.04 |
| 1×0.085 mole ammonium nitrate | 6.80 |
| 1×0.085 mole urea | 5.10 |
| Total weight | 21.94 |

While mixing, a thermometer dipped into the semifluid registered 17° C. with the room temperature at 29° C. The density of this mix, assuming no reaction among the substances is taking place, was obtained by multiplying the density of each substance by its weight-fraction of the total weight. For example, the weight-fraction of acetamide is the 10.04 grams in the mix divided by the total weight of the mix, 21.94 grams. Thus, $$\frac{10.04}{21.94} \times 1.139$$

(the density of acetamide) gives 0.520 which is then the contribution of acetamide to the hypothetical density of the mix.

The complete calculation follows:

| Acetamide | $\frac{10.04}{21.94} \times 1.139 = 0.520$ |
|---|---|
| Ammonium nitrate | $\frac{6.80}{21.94} \times 1.725 = 0.524$ |
| Urea | $\frac{5.10}{21.94} \times 1.324 = 0.307$ |
| Total average density | 1.351 |

The actual density of the acetamide-ammonium-nitrate-urea fluid solution (it had been kept in a sealed jar for 24 hours after mixing) was measured by weighing a known volume in a pycnometer, a small flask with a perforated glass stopper. The density was 1.22 or 0.13 less than the density should have been had the substances not reacted in any way with each other. This decrease in weight per unit volume is the same as an increase in volume of about 10%.

This increase in volume indicates that the average distance between the particles (molecules or free radicals) of the fluid solution of acetamide-ammonium nitrate-urea is greater than the average distanec between the molecules of the original substances.

Also possible is an increase in the total number of particles, perhaps as free radicals. Spacially this would amount to the same thing; that is, wider dispersal in space of the original matter as observed as a decrease in density.

Wider dispersal implies an increase in energy content of the fluid solution over that of the original components. An absorption of considerable energy was proved by the drop in temperature from 29° to 17° C. while mixing.

These observations, increase in volume of the fluid solution and fall in temperature while mixing, make understandable the fluidity of the solution (a viscosity near that of water) in contrast with the rigidity of the original crystalline substances. That liquefaction is a consequence of dissociation of the original molecules into less complex molecules or free radicals is indicated by the following:

(1) The fluidity itself indicates great mobility of the unit particles and strongly suggests that they are small and of simple molecular structure.

(2) The fall in temperature on mixing is probably due, at least partly, to the breaking of chemical bonds.

(3) According to one measurement, fluidization is accompanied by increase in volume or decrease in density. This would be expected from the partial breaking up of more complex molecules.

(4) The observation that a mixture of water solutions of urea and ammonium nitrate is more effective in dispelling fog than solutions of the same concentration of the single substances is in harmony with the hypothesis of dissociation.

If the fog-dispelling effectivensss of a solution is due to its lowered vapor pressure, then according to Raoult's law, the mixed solution with its lower vapor pressure must contain a greater concentration of particles (molecules or free radicals) than the sum of the particles in the separate solutions. Apparently the substances act upon each other in such a way as to lead to partial or complete dissociation into a large number of simpler units. The possible explanation for the effectiveness of the solution used is that a reaction may be taking place producing more and smaller molecules in the solution.

An infrared analysis was made of a solution comprising 2 moles acetamide, 1 mole urea and 1 mole ammonium nitrate. The analysis showed a band at 1760, which apparently indicates a new composition.

Fog chamber tests indicate that a fluid solution containing no water-1 mole acetamide, 1 mole urea, 1 mole ammonium nitrate (optionally with the addition of some ethylene glycol) is effective for fog dispelling and rain making.

A mixture of 2.95 grams acetamide, 2 grams ammonium nitrate, 1.5 grams urea were placed in a container with glass balls. The container was sealed and shaken. A mixture of acetamide, ammonium nitrate and urea started to fluidize after about two minutes of shaking. The mixture was found to have a great impact on and cleared most of a quite stable and heavy fog made from a concentrated salt solution. The solution did not crystallize even at a refrigerated temperature of 6° C.

Several other solutions were made for fog-dispelling based upon this combination of urea, acetamide and ammonium nitrate. They included the following:

A mixture of four grams of ammonium nitrate, four grams acetamide and three grams of urea were heated until the mixture melted. The mixture was then cooled. The mixture did not crystallize at room temperature nor did it crystallize when it was refrigerated to 4° C.

A mixture of 5.9 grams acetamide, 4 grams ammonium nitrate and 3 grams urea was placed in a beaker. The molar proportion was respectively, 2:1:1. The mixture was heated until it melted and the fluid solution was poured into a bottle and sealed. It did not crystallize at room temperature or at 4° C.

Any of the additional agents used with the other combinations discussed above may be incorporated into the mixture of urea, acetamide and ammonium nitrate. For example, homogeneous fluids were made without the use of water from: (a) 4 moles acetamide, 4 moles urea, 4 moles ammonium nitrate, and 1 mole ammonium bicarbonate; and (b) 1.5 moles acetamide, 1.5 moles urea, 1.5 moles ammonium nitrate, and 1 mole ammonium acetate, $NH_4C_2H_3O_2$. Both fluids were colorless. Another mixture was made from 2.9 grams acetamide, 1.5 grams urea, 2 grams ammonium nitrate, and 1.7 grams sodium nitrate; molar ratio 2:1:1:1 respectively. It was shaken in a glass jar containing glass balls. There was a sign of fluidization at once and the mixture fluidized into a slurry. When 1 mole urea and 1 mole acetamide were added, the mixture was still a slurry.

The ratio of acetamide:urea:ammonium nitrate for the compositions of this invention is preferably 1–2:1:1, in which the lower amounts of acetamide result in solutions which more readily retain their fluidity. Water of course may be added to these solutions in an amount up to 5 moles or more for each 3 moles of solution of acetamide, urea and ammonium nitrate. Slightly additional amounts of one or more of the ingredients in the solution of the 1–2:1:1 mole ratio of acetamide, urea and ammonium nitrate may be used if desired since the solution may act as a solvent or form a slurry.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed is:

1. An antifogging liquid composition consisting of at least two of the compounds selected from the group consisting of, on a molar ratio, about one to two moles acetamide, about one mole urea and about one mole ammonium nitrate, with from zero to five moles of water, wherein the amount of water for said composition comprising two of said compounds is from one-half mole to five moles.

2. The composition of claim 1 comprising about one to two moles acetamide, about one mole urea and about one mole ammonium nitrate.

3. The composition of claim 1 comprising about two moles of acetamide, one mole of urea and from three-fourths of a mole to five moles of water.

4. The composition of claim 1 comprising about two moles of acetamide, about one mole of ammonium nitrate and from one-half mole to five moles of water.

5. The composition of claim 1 comprising about one mole of urea, about one mole of ammonium nitrate and from one-half mole to five moles of water.

6. The composition of claim 1 wherein said liquid comprises acetamide, urea and ammonium nitrate, with substantially no water.

7. The composition of claim 1 wherein the molar ratio of said compounds to water is approximtaely 1:0.25 to 2.5.

References Cited

UNITED STATES PATENTS

| | | | |
|---|---|---|---|
| 3,185,648 | 5/1965 | Standish et al. | 106—13 X |
| 3,297,577 | 1/1967 | Standish et al. | 252—70 |
| 3,108,075 | 10/1963 | Hearst | 252—70 |

JAMES A. SEIDLECK, Primary Examiner

H. J. LILLING, Assistant Examiner

U.S. Cl. X.R.

252—70, 194